United States Patent [19]
Hurst et al.

[11] Patent Number: 5,662,791
[45] Date of Patent: Sep. 2, 1997

[54] RADIATOR COOLING SYSTEM FILTER ASSEMBLY

[76] Inventors: John P. Hurst; Jeanette W. Hurst, both of 280 Pigeon River Rd., Sevierville, Tenn. 37862

[21] Appl. No.: 563,119

[22] Filed: Nov. 29, 1995

[51] Int. Cl.$^6$ ..................... B01D 35/02
[52] U.S. Cl. ............ 210/94; 210/167; 210/232; 210/436; 210/448
[58] Field of Search .............. 210/85, 94, 167, 210/232, 435, 436, 446, 448

[56] References Cited

U.S. PATENT DOCUMENTS

| | | | |
|---|---|---|---|
| 1,832,776 | 11/1931 | Hudson | 210/448 |
| 2,910,717 | 11/1959 | Raymond | 210/94 |
| 3,317,043 | 5/1967 | Vanderpoel | 210/94 |
| 4,052,308 | 10/1977 | Higgs | 210/167 |
| 4,062,774 | 12/1977 | Hinojosa | 210/94 |
| 4,883,587 | 11/1989 | Le Veen et al. | 210/94 |
| 5,100,541 | 3/1992 | Kallenbach | 210/94 |
| 5,160,427 | 11/1992 | Barnette | 210/95 |
| 5,281,331 | 1/1994 | Golan | 210/131 |
| 5,382,355 | 1/1995 | Arlozynski | 210/85 |
| 5,536,402 | 7/1996 | Kluhsman | 210/448 |

*Primary Examiner*—Neil McCarthy
*Assistant Examiner*—Theodore M. Green
*Attorney, Agent, or Firm*—Joseph N. Breaux

[57] ABSTRACT

A radiator cooling system filter assembly comprising a first housing member, a second housing member and a filter element. The first and second housing members are interconnectable with a snap fitting to form a filter element cavity into which the filter element is disposed during use. The first housing member includes a first cooling hose fitting at one end. The second housing member includes a second cooling hose fitting at one end. The first and second housing members are interconnectable in a manner such that when the first and second housing members are snapped together to form the filter element cavity, the filter element cavity provides a fluid pathway between the first and second cooling hose fitting. In addition, one of the first and second housing members is provided with a valve mechanism selectively operable by a user to provide a fluid pathway between the filter element cavity and the exterior of the cooling system.

4 Claims, 1 Drawing Sheet

RADIATOR COOLING SYSTEM FILTER ASSEMBLY

TECHNICAL FIELD

The present invention relates to in-line filter assemblies used to remove debris from a fluid flow line and more particularly to an in-line filter assembly, used to remove debris from the cooling fluid flow line in the radiator system of a water cooled engine, having a two part filter element housing.

BACKGROUND ART

Contaminates such as rust particles and metal shavings can become dislodged from the interior of the engine and enter and clog or restrict flow through the radiator of the engine cooling system. When the radiator becomes plugged, costly engine and radiator repairs can result. In addition, because the engines are often installed on expensive commercial equipment, engine down time can result in significant economic losses as well. It would be a benefit, therefore, to have a filter assembly that could be installed between the engine and the radiator of the engine cooling system that could trap contaminants before they entered the radiator. In addition, because the clogging of the filter assembly itself could result in damage to the engine, it would be desirable if the filter element within the filter assembly were easily checked and replaced when necessary. It would be a further benefit if the filter assembly included a pressure relief valve in order to vent high pressure within the engine cooling system prior to replacement of the filter element.

GENERAL SUMMARY DISCUSSION OF INVENTION

It is thus an object of the invention to provide a radiator cooling system filter assembly that is installable between an engine and the radiator of the engine cooling system to trap contaminants before they enter the radiator.

It is a further object of the invention to provide a radiator cooling system filter assembly that includes an easily checked and replaced filter element.

It is a still further object of the invention to provide a radiator cooling system filter assembly that includes a user actuated pressure relief valve for allowing a user to vent high pressure from the engine cooling system prior to replacement of the filter element.

It is a still further object of the invention to provide a radiator cooling system filter assembly that accomplishes all or some of the above objects in combination.

Accordingly, a radiator cooling system filter assembly is provided. The filter assembly comprises a first housing member, a second housing member and a filter element. The first and second housing members are interconnectable with a snap fitting to form a filter element cavity into which the filter element is disposed during use. The first housing member includes a first cooling hose fitting at one end. The second housing member includes a second cooling hose fitting at one end. The first and second housing members are interconnectable in a manner such that when the first and second housing members are snapped together to form the filter element cavity, the filter element cavity provides a fluid pathway between the first and second cooling hose fitting. In addition, one of the first and second housing members is provided with a valve mechanism selectively operable by a user to provide a fluid pathway between the filter element cavity and the exterior of the cooling system.

The first and second housing members are preferably constructed from a transparent material to allow for easy viewing of the filter element. The filter element is preferably a basket type filter constructed from a fine mesh of a high temperature plastic or metal.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
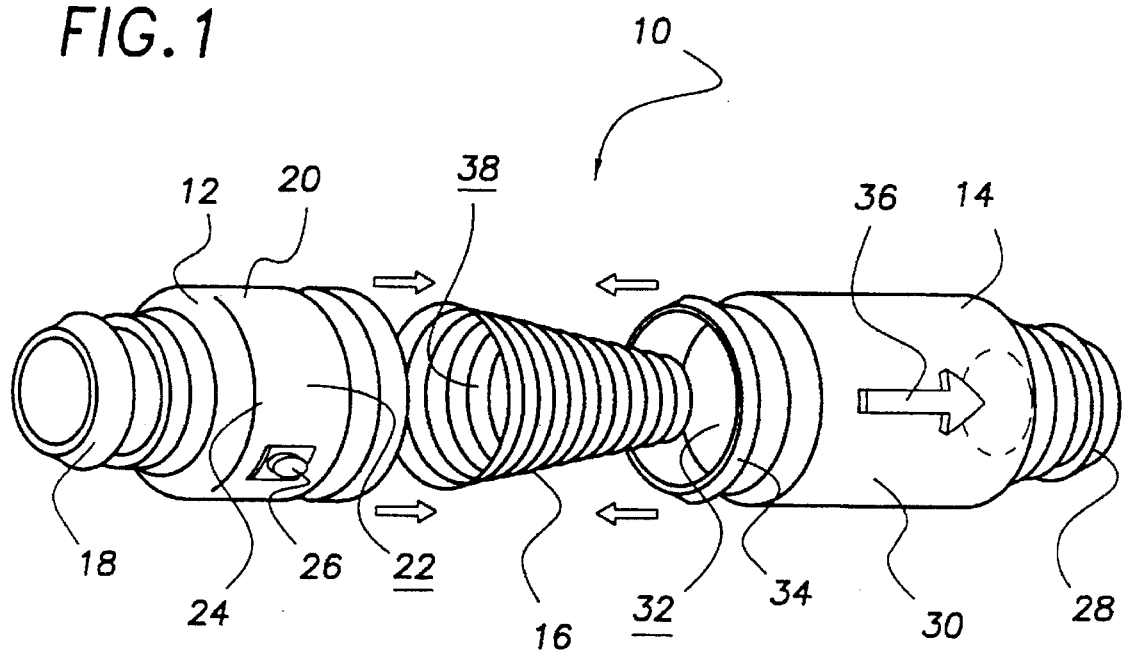
FIG. 1 is an exploded perspective view of an exemplary embodiment of the radiator cooling system filter assembly of the present invention including the first and second housing members and the filter element.

FIG. 1 is an exploded perspective view of an exemplary embodiment of the radiator cooling system filter assembly of the present invention generally designated by the numeral 10. Filter assembly 10 includes a first housing member 12, a second housing member 14, and a filter element 16.

First housing member 12 is constructed from a clear polycarbonate plastic and includes a first cooling hose fitting 18; a first filter housing portion 20 having a first filter element cavity 22 formed therein; an interior peripheral channel 24 that forms a portion of the a snap connector for securing first and second housing members 12,14 together; and a pressure relief valve 26. Pressure relief valve 26 includes an internally threaded aperture, a washer shaped gasket member and a knob member having an externally threaded rod portion that may be tightened into the threaded aperture to prevent escape of pressurized gasses and liquids.

Second housing member 14 is constructed from a clear polycarbonate plastic and includes a second cooling hose fitting 28; a second filter housing portion 30 having a second filter element cavity 32 formed therein; an exterior peripheral lip 34 that forms the second portion of the snap connector and mateably fits within interior peripheral channel 26. The exterior of second housing member 14 includes a raised arrow indicator 36 to indicate to the user the desired direction of radiator coolant flow through filter assembly 10.

Filter element 16 is a conical shaped bronze wire mesh screen having a open end 38 of a diameter that corresponds with the diameter of first filter element cavity 22.

Figure 2:
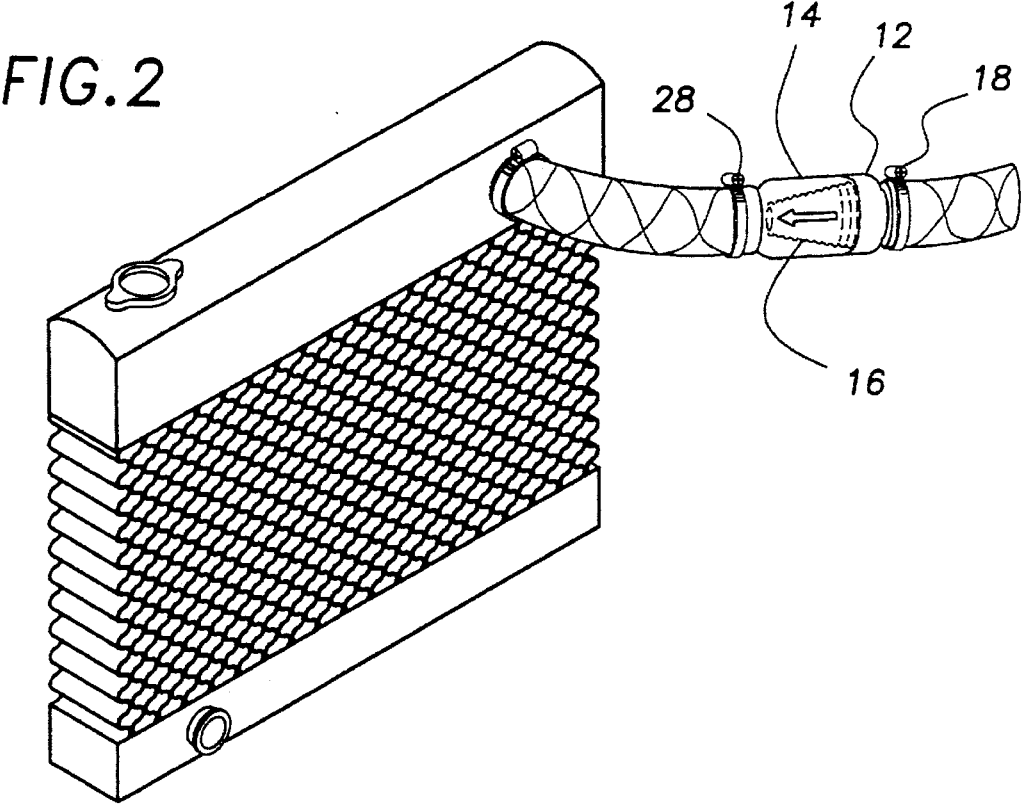
FIG. 2 is a perspective view of the embodiment of the filter assembly shown in FIG. 1 installed in the return line of a representative radiator.

In use, the open end 38 of filter element 16 is placed within first filter element cavity 22 and then first and second housing members 12,14 are secured together by forcing exterior peripheral lip 34 into mating relationship with interior peripheral channel 26. With reference to FIG. 2, once first and second housing members 12,14 are secured together with filter element 16 installed partially within first filter element cavity 22 and partially within second filter element cavity 32, filter assembly is installed in-line with the coolant return hose by removing a section of the existing return hose and connecting coolant hose fitting 18 to the section of coolant hose connected to the engine block and cooling hose fitting 28 to the section of the cooling hose connected to the radiator return port. This is accomplished by sliding the coolant hose over the fitting 18,28 and securing the hose in place with a conventional hose clamp. The engine is now operable in the normal fashion. Before each engine operation, or at regular operating intervals, the extent of clogging of filter element 16 is determined by viewing filter element 16 through clear first and second housing members 12,14. When it is determined that filter element 16 requires cleaning, first and second housing members 12,14 may be separated and filter element 16 removed and either cleaned or replaced.

It can be seen from the preceding description that a radiator cooling system filter assembly has been provided that is installable between an engine and the radiator of the engine cooling system to trap contaminants before they entered the radiator; that includes an easily checked and replaced filter element; and that includes a user actuated pressure relief valve for allowing a user to vent high pressure from the engine cooling system prior to replacement of the filter element.

It is noted that the embodiment of the radiator cooling system filter assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A radiator cooling system filter assembly comprising:

a first housing member;

a second housing member;

a snap connector for connecting said first and second housing members together in use; and a filter element;

said first housing member being constructed from a clear plastic material and including a first cooling hose fitting, a first filter housing portion having a first filter element cavity formed therein; an interior peripheral channel that forms a portion of said snap connector utilized to secure said first and second housing members together in use; and a pressure relief valve;

said second housing member being constructed from a clear plastic material and including a second cooling hose fitting; a second filter housing portion having a second filter element cavity formed therein; an exterior peripheral lip that forms said second portion of said snap connector and mateably fits within said interior peripheral channel of said first housing member;

said filter element being a conical shaped screen having a open end of a diameter that corresponds with an internal diameter of said first filter element cavity;

said first and second housing members forming a complete filter element cavity of a size sufficient to completely house said filter element when interconnected with said snap connector.

2. The radiator cooling system filter assembly of claim 1, wherein:

said pressure relief valve includes an internally threaded aperture, a washer shaped gasket member and a knob member having an externally threaded rod portion that may be tightened into said threaded aperture to prevent escape of pressurized gasses and liquids.

3. The radiator cooling system filter assembly of claim 1, wherein:

an exterior portion of said second housing member includes a raised arrow indicator having a point directed in a desired direction of radiator coolant flow through said filter assembly.

4. The radiator cooling system filter assembly of claim 3 wherein:

said pressure relief valve includes an internally threaded aperture, a washer shaped gasket member and a knob member have an externally threaded rod portion that may be tightened into said threaded aperture to prevent escape of pressurized gasses and liquids.

* * * * *